US012528019B2

(12) United States Patent
Cockram et al.

(10) Patent No.: US 12,528,019 B2
(45) Date of Patent: Jan. 20, 2026

(54) PLAYER SELECTION SYSTEM AND METHOD

(71) Applicant: Sony Interactive Entertainment Inc., Tokyo (JP)

(72) Inventors: Philip Cockram, London (GB); Christopher William Henderson, London (GB); Michael Eder, London (GB); Daniele Bernabei, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 324 days.

(21) Appl. No.: 18/317,239

(22) Filed: May 15, 2023

(65) Prior Publication Data

US 2023/0372828 A1 Nov. 23, 2023

(30) Foreign Application Priority Data

May 18, 2022 (GB) ..................................... 2207264

(51) Int. Cl.
*A63F 13/795* (2014.01)
*A63F 13/48* (2014.01)
*A63F 13/533* (2014.01)

(52) U.S. Cl.
CPC ............ *A63F 13/795* (2014.09); *A63F 13/48* (2014.09); *A63F 13/533* (2014.09)

(58) Field of Classification Search
None
See application file for complete search history.

(56) References Cited

U.S. PATENT DOCUMENTS 10,807,006 B1 10/2020 Davis
2005/0149467 A1* 7/2005 Ono ........................ G06F 3/011 706/1
2012/0094762 A1 4/2012 Khan
2012/0311032 A1* 12/2012 Murphy ................. G06Q 50/01 709/204
2015/0099586 A1* 4/2015 Huang .................. A63F 13/212 463/40
2021/0265055 A1 8/2021 Murdock

OTHER PUBLICATIONS

Combined Search and Examination Report for corresponding GB Application No. 2207264.9, 7 pages, dated Nov. 4, 2022.
Extended European Search Report for corresponding EP Application No. 23171090.6, 8 pages, dated Oct. 2, 2023.

* cited by examiner

*Primary Examiner* — Paul A D'Agostino
(74) *Attorney, Agent, or Firm* — Kilpatrick Townsend & Stockton LLP

(57) ABSTRACT

A game selection system includes an emotion processor configured to obtain a current emotional state of a user; a descriptor processor configured to obtain one or more emotion descriptors associated with one or more games; an evaluation processor configured to predict an emotion outcome for the user for the or each game, based upon the user's current emotional state and the one or more emotion descriptors of the respective games; and a selection processor configured to select one or more games in response to whether their respective emotion outcomes meet at least a first predetermined criterion.

15 Claims, 3 Drawing Sheets

PLAYER SELECTION SYSTEM AND METHOD

BACKGROUND OF THE INVENTION

Field of the Invention

The present invention related to a player selection system and method.

Description of the Prior Art

As people accumulate libraries of games, or join game subscription services that provide access to a large number of titles, it can be difficult for a user to decide what game to play. The conventional approach is to look at game reviews, game trailers, screenshots, or any other information that may enable a user assessment of a particular game.

However for a library of for example several hundred games, such an approach is not practical.

Similarly, as games and online social environments increase in size and allow ever more players to participate, and/or where users know ever more online friends, it can be difficult for a user to decide who to play with. The conventional approach is to look at the comparative skill of users to make a match. However, this is not always the best or only metric to use.

The present invention seeks to mitigate or alleviate such problems.

SUMMARY OF THE INVENTION

Various aspects and features of the present invention are defined in the appended claims and within the text of the accompanying description.

In a first aspect, a game selection system is provided in accordance with claim 1.

In another aspect, a game selection method is provided in accordance with claim 13.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A player and/or game selection system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
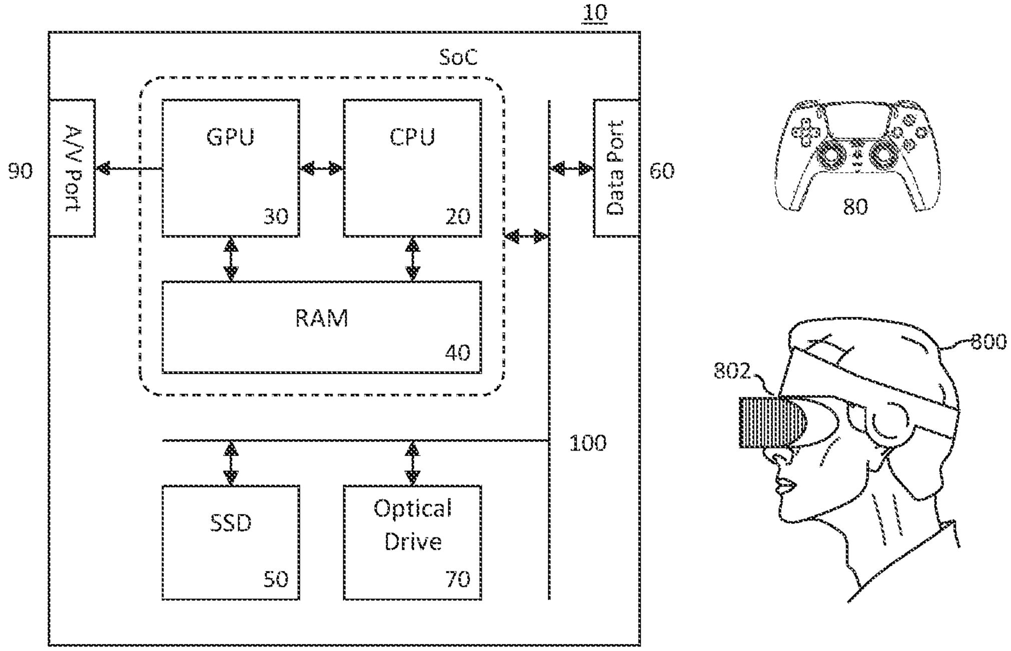
FIG. 1 is a schematic diagram of a player and/or game selection system in accordance with embodiments of the description.

Referring now to the drawings, wherein like reference numerals designate identical or corresponding parts throughout the several views, FIG. 1 shows an entertainment system 10, for example a computer or console such as the Sony® PlayStation 5 ® (PS5), configurable as a player and/or game selection system in accordance with embodiments of the present description.

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

Game Selection/Launch

In embodiments of the present description, the game launch system, or more generally game selection system, comprises the following.

Firstly, an emotion processor (for example CPU 20/GPU 30) configured (for example by suitable software instruction) to obtain a current emotional state of the user, as described elsewhere herein.

Secondly, a descriptor processor (for example CPU 20/GPU 30) configured (for example by suitable software instruction) to obtain one or more emotion descriptors associated with one or more games, as described elsewhere herein.

Thirdly, an evaluation processor (for example CPU 20/GPU 30) configured (for example by suitable software instruction) to predict an emotion outcome for the user for the or each game, based upon the user's current emotional state and the one or more emotion descriptors of the respective games, as described elsewhere herein.

And fourthly, a selection processor (for example CPU 20/GPU 30) configured (for example by suitable software instruction) to select (and in some cases to optionally launch) one or more games in response to whether their respective emotion outcomes (e.g. the predicted emotion outcomes) meet at least a first predetermined criterion, as described elsewhere herein.

The emotion processor may obtain an indication of the user's current mood in one or more of a variety of ways.

Firstly, the game selection system may provide a user interface through which the user may provide an explicit indication of their mood. This user interface may comprise one or more dedicated buttons or keys of a controller or other input device such as a keyboard, or may comprise a graphical user interface through which the user can input, select, or otherwise indicate their mood.

Alternatively or in addition, an indication of the user's current mood may be obtained from a psychometric or behavioural test embedded within a game or other app used by the user within the predetermined period prior to selecting a current game based on that mood.

A psychometric or behavioural test may be built into a an app or game, for example in terms of in-game choices made by the user; for example choosing a peaceful or violent option in a game may be respectively indicative of different user moods, as may the selection of different responses in one or more dialogue trees, or the selection of particular weapons, character classes, or the like.

These tests may be particularly useful in the case where the game selection system is considering the recommendation, shortlisting, selection, or launch of one of a plurality of quests or similar optional or elective game elements currently accessible to a user within the same game and play session; hence for example if a user is clearly irritable during the completion of one quest, this emotional state may be used to inform the recommendation, shortlisting, selection, or launch of a new quest etc., within the same game's play session.

Alternatively or in addition, such information can be carried over for a predetermined period of time to be used in the recommendation, shortlisting, selection or launch of subsequent games and/or quests within such games.

Alternatively or in addition to such explicit indications or test based indications, other indicia of the user's current mood/emotional state can be estimated from one or more of a plurality of sources, including the following.

i. One or more physiological measurements. for example heart rate, galvanic skin response, pupil dilation, and the like can be treated as indicators of calm or stress depending on the values measured.

ii. One or more behaviours. Examples of behaviours (physical and/or in-game) include throwing or slamming a controller 80, so-called 'rage quitting' (in the case of anger); frequent game saves or checking certain itinerary items such as health packs (in the case of nervousness or anxiety), frequent messaging or use of in-game taunts or emotes (in the case of happiness) and the like.

iii. Body language. If a video camera (e.g. a webcam) is connected to the game selection system, then the user's body language can be assessed. The user can be recognised and an approximate skeletal model generated (e.g. though centre lines of limbs, torso and head), and this can be compared with known poses and/or pose transitions to estimate body language. The body language in turn can be associated with relevant moods.

iv. One or more facial expressions. Facial expressions can be recognised, e.g. by template matching, and associated with relevant moods.

v. One or more spoken expressions. Various expressions of happiness, joy, anger, frustration and the like in a respective language can be associated with the relevant moods. Similarly volume and/or tone of voice may be treated as indicia.

vi. Use of a user input device relative to a baseline use. By comparing the use of the controller, HMD, or other input device to historical use or mean user (either of the user alone, or a wider cohort of users), changes in behaviour can be determined; hence for example so-called 'button mashing' can be an indication of frustration, whilst either missing a timed input, or not using a function that is frequently used, may be indicative of tiredness or inattention.

Where an input could be ambiguous, either each of the possible associated emotions is considered, or only emotions estimated from multiple inputs are considered, and/or emotions are disambiguated based on an emotion history, e.g. that a current emotion is more likely to be the same or similar to a recent emotion, than an entirely contradictory one. Different predetermined emotion paths for different emotional journeys may be used to disambiguate different emotions and/or emotion histories for a user.

Similarly where an input could be ambiguous, the nature of the current game or app could also be used; one or more emotion descriptors associated with a current game or app could be used to assist with disambiguating an estimated emotional state of the user. Hence a horror game might induce stillness and occasional motion in the user's controller that may look similar to the controller motion in a golf game, but the emotional experience of the user in each case is likely to be different. Typically some other measure would disambiguate this (e.g. heart rate, facial expression, body language, utterances or the like), but if these are not available (or more generally if whatever available measures are insufficient to disambiguate the emotional state of the user) then alternatively or in addition one or more emotion descriptors of the current game may be used to disambiguate the measurements.

In any event, a current estimate of the user's mood may thus be obtained. The estimate may take the form of a label such as 'happy', 'excited', 'frustrated', 'tense', 'angry', or 'calm', or may be a parametric value such as the likelihood of the user being in one of these states, thereby allowing for mixtures such as '50% happy, 50% frightened' or the like. Alternatively or in addition values relating to the measurements upon which the emotion estimates may be based may also be included (e.g. heart rate), and similarly any direct inputs from the user regarding their emotional state, or any data from a psychometric or behavioural test conducted within a predetermined prior period (e.g. 5, 10, 15, or 30 minutes) may also be included as aspects of the user's current emotional state.

Meanwhile, in embodiments of the present description, emotion descriptors may be associated with one or more selected from the list consisting of a game; respective quests or levels/zones etc., of a game; and respective playing modes of a game.

This recognises that a game may provide different emotional rewards at different times within the game or when played in different ways; for example a multiplayer mode of a game may be more frenetic than a single player story, and engender different emotional responses. Meanwhile different quests or equivalently levels, zones, or other compartmentalised aspects of the game such as 'DLCs' (downloadable content) may provide different emotional rewards, with some being thrilling, sad, materially rewarding within the game, or the like.

Accordingly, an emotion descriptor for all or part of a game or game mode typically indicates the emotional state that a typical or average user may be expected to occupy when/after playing the relevant game, game part or game mode. In this case the typical or average user may be assumed to have either a neutral initial emotional state or otherwise predicted emotional state (e.g. if a current part of the game immediately followed a preceding part of the game which also has an emotion descriptor, then the initial emotional state of the user may be assumed based on the preceding emotion descriptor, and so on throughout the game).

In order to base the recommendation, shortlisting, selection, or launch of a game on such emotion descriptors, the descriptor processor is operable to retrieve emotion descriptors for at least a subset of games currently accessible by the user.

These may be for example games are already installed on the user's device, and/or games accessible using a game streaming service or other instant play mechanism such as the PlayStation Now® streaming service. Meanwhile within a single game, the 'subset of games' may equivalent a relate to the subset of quests, levels, regions, or the like that are currently accessible within the game (e.g. accessible if the game was opened or resumed at the last save point for the game).

In embodiments of the description, the evaluation processor is configured to predict an emotion outcome based on a previously determined correlation between at least a first aspect of an emotion descriptor, at least a first aspect of the obtained current emotional state of the user, and a corresponding emotion outcome.

The at least first aspect may relate to the label of the emotion descriptor such as 'happy' or 'sad', or a parametric description such as the previously mentioned percentage likelihood a given emotion (which for a plurality of motions may for example take the form of a emotion vector).

The correlation relates to what emotion outcome (emotional state) occurs when a user with a particular current emotional state plays a game (game, game quest/level/zone, game mode, etc) having a particular emotion descriptor.

Whilst the game emotion descriptor may be assumed to be an accurate prediction for a neutral or average player, it may not be for a user with a particular current emotional state (or optionally a given emotional state sequence over a predetermined prior period).

To predict what emotional state a user will end up in based on their current emotional state or emotional state sequence and the game emotion descriptor, a correspondence or correlation can be learned for example based on data from the corpus of users.

Hence the correlation between one or more aspects of an emotion descriptor and of an emotional state, and subsequent emotional outcome, can be based upon emotion data from a corpus of previous players.

In this case, data from a plurality of players may be previously obtained in a similar manner to how the current emotional state of the current player is obtained (indicated or measured). These players may be quality assurance testers, alpha or beta testers, early access users, and/or an initial and/or previous tranche of players of the game.

For these players, their current emotional state and the emotion descriptor for the game for use as input, and their eventual emotional state after playing the game is used as output for the purposes of establishing a correlation between the inputs and the output. Any suitable correlator may be used for this purpose, including for example a machine learning system such as a neural network.

Hence for example a trained machine learning system may receive as input one or more aspects of the user's current emotional state (for example an input emotion vector comprising values relating to the probability of different emotional states, or alternatively or in addition just a flag for a particular emotion) and one or more aspects of the gain emotion descriptor (again for example an input emotion vector comprising values relating to the probability of different emotional states, or alternatively or in addition just a flag for a particular emotion). During training, the machine learning system receives as a target output one or more aspects of the users eventual emotional state after playing the game/quest/mode etc., (again for example an input emotion vector comprising values relating to the probability of different emotional states, or alternatively or in addition just a flag for a particular emotion).

In this way, the machine learning system learns to predict the emotional outcome of a user based on their current emotional state and the game emotion descriptor.

Optionally the machine and the system may be trained on a sequence of emotional states of the user, for example the last N characterisations of their emotional state, typically within a predetermined prior period. The machine learning system may then use this emotional trajectory as the input, to refine the predictions.

An advantage of this approach is that the predicted emotional outcome from playing the game/level/mode is based on a ground truth relating to the emotional state of previous players before and after playing the game, using the game emotion descriptor as a means of identifying or triggering which correlation is relevant.

Whilst it is computationally advantageous to use similar inputs for both the user's current emotional state and the game emotion descriptor (as for most machine learning systems, similar-meaning inputs that are also correlated with the output facilitate efficient learning), optionally the game emotion description can simply be an identifier of the game/quest/level, with the emotion description being implicit in that identification and learned through the ensuing correlation.

In this case the machine learning system needs to internally model how the identifier implies or triggers an emotional link between the input user state and the target/predicted emotion state. If the machine learning system has to model many games/quests/levels in this way it may become error-prone (or require a comparatively larger number of neurons or equivalent connections) as it would be using uncorrelated identifiers (e.g. the title or other ID of a game does not in itself necessarily relate to the emotional outcome of the game)—however, if the machine learning system only has to learn about a small number of games, or there is a machine learning system per game, then the process devolves so that the emotion descriptors associated with one or more games/quests/etc. are for example simple flag inputs or values indicating which of the games/quests/etc. is being considered.

In other words, one may use emotion descriptors that are general or universal and relate to the user's expected emotions when the machine learning/correlating system is applied generally to any game (or a large number of games), but the input emotion descriptors can increasingly rely on an indication of the specific game and less on the emotions associated with it as the number of games the machine learning system has to model gets smaller. Finally, if it only models one game, then selection of that machine learning model or equivalent correlator is itself the indication and no explicit input from the game is needed (though it could still be used).

As noted previously herein, the target data used for training such a system can be the same combination of indications and/or measurements described previously herein; hence where a user's current emotional state is measured during a game or at certain points in a game (e.g. periodically, and/or based on events such as completing a quest or level, or defeating a boss, or other scripted moments), this can also be treated as an emotional outcome for that game corresponding to a previous emotional state of the user earlier in the game (e.g. at the start of a quest or level, and the like). These pairs of evaluations can then be used for training the system. The corpus of users contributing to such training data can be quality assurance testers, alpha or beta testers, early access users, and/or an initial and/or previous tranche of players of the game. Furthermore, where the emotion descriptors are applicable to a plurality of games, then information from a plurality of games can be used to train the system, or information from one game can be used for predicting outcomes for other games (for example an initial machine learning system can be trained using a first game, and this can then be used to help with predictions for new games before a significant cohort of players have played them. Of course, optionally subsequent training material of such other games can also be added to the training set.

It will be appreciated that the emotion descriptors for games may be generated for the game by its developer, for example according to a set of guidelines intended to provide a consistent evaluation of games for this purpose. However, it is possible that a developer or publisher's evaluation of the emotional effect/outcome of a game is not borne out by actual user experience. Therefore optionally the emotion description for a game may itself be derived from prior user data, for example averaged across a cohort of users. Further optionally an initial estimate of the emotion description by the developer or publisher may give way to such an empirical emotion description, for example by a weighted average of the two descriptions that transitions from 100% the initial estimate to 100% the empirical one as the number of players contributing to the empirical estimate increases to a suitable statistically significant number.

Further optionally, the cohort of users may be divided up according to their initial emotion state, so that different emotion descriptors for the game are used for different initial user emotional states. In this way the emotion descriptor input to the correlator is likely to be a much closer approximation of the target during training and the prediction during use. These initial emotion states could be automatically categorised, for example using K-means clustering to generate K initial states. The initial state closest to the user's current emotional state could then be used as the emotion descriptor input alongside the user's current emotional state to obtain a more accurate prediction of the expected emotional outcome for the user.

Next, in embodiments of the description, where the selection processor is configured to select one or more games in response to whether their respective emotion outcomes meet at least a first predetermined criterion, that predetermined criterion may be one or more selected from the list consisting of the predicted emotional outcome matching a desired emotional outcome indicated by the user; the predicted emotional outcome being in a predetermined group of emotional outcomes that includes a desired emotional outcome indicated by the user; and the predicted emotional outcome being in a predetermined group of emotional outcomes selected as being positive (e.g. positive given the user's input emotional state).

In the first case, the desired emotional outcome indicated by the user by be indicated again either by a button or other physical input, or via a user interface (e.g. either typing their wish, or using a graphical input).

Alternatively, the desired emotional outcome may be indicated implicitly or unintentionally; for example a series of emotional states of a predetermined prior period may indicate the user's desired emotional trajectory, or (via a simple continue/change interface) indicate the direction the user does not want to continue in.

Similarly alternatively, the desired emotional outcome may be indicated via previous interactions with the system; for example by indicating satisfaction with a previous emotional outcome, the system can learn what emotional state transitions the user considers to be positive. Hence the indication does not need to be in advance of the selection process, but can be based on previous indications of successful selection processes.

In the second case, the same general approaches can apply, but the match can be more approximate; for example some people might equally want fear or excitement from a particular game session, and so any predicted emotional outcome falling in that group is seen as good.

In the third case, the same general approaches can apply but the match can be more approximate still, with any emotional outcome assumed or empirically measured to be positively received by the user (or other such users) being seen a good.

Alternatively or in addition to criteria based on user emotional outcomes, optionally criteria can be based on outcomes set by the game—this enables the games developer to effectively choose when a game/quest/level/etc., will be selected so that the emotional outcome for the user best matches the emotional outcome that the game developer wants to achieve.

Hence in this case the predetermined criterion is one or more selected from the list consisting of the predicted emotional outcome matching a desired emotional outcome indicated by the game; and the predicted emotional outcome being in a predetermined group of emotional outcomes that includes a desired emotional outcome indicated by the game. Again the evaluation of these is generally the same as described previously for the user-based outcomes.

The degree of match (or the centrality of a match within a group, or the degree of match to a preferred emotional outcome with such a group, as desired) can be used to rank the results for a plurality of games, and/or game levels/zones/quests/modes/etc.

Based on such a ranking, the selection processor may be configured to select one selected from the list consisting of a single game quest or level currently accessible by the user; a single game currently accessible by the user in a particular play mode; a single game currently accessible by the user; a shortlist of game quests or levels currently accessible by the user; a shortlist of game quests or levels currently accessible by the user in respective play modes; and a shortlist of games currently accessible by the user.

Hence it will be appreciated that the game selection system may recommend or select some or all of a game, or a shortlist of some or all of a plurality of games, from among a set of game accessible to a user (i.e. games they can play in response to the selection, for example games installed on the user's games machine, or accessible through a subscription streaming service). Optionally other games (and/or so-called DLCs for existing games) that may be downloaded and installed before play may also be included.

Optionally, the top ranking game (game/quest/mode/etc) may be launched by the game selection system. The launch may either be automatic, or may comprise a dialog step where the user is asked if they want to launch the game. Optionally the reason why the game has been selected for launch may be provided (e.g. the expected emotional outcome of play). Optionally the launch process may include a shortlist of games, the selection of one of which by the user continues the launch process for that game/quest/mode/etc.

Hence the selection processor may be configured to launch one selected from the list consisting of: a quest or level of a game currently accessible by the user; a game currently accessible by the user in a particular play mode; and a game currently accessible by the user, and/or optionally launch any of these with a preceding user check, or shortlist for launch a plurality of such items with user final selection of what proceeds to launch.

Variants of the above system may include additional information indicative of the current user's emotional state (and/or similarly the emotional state of prior uses within a corpus used for training/empirical data purposes as described elsewhere herein). This additional information may include for example duration of playtime of a game (game, quest/level/mode etc.). If a user plays for longer than an average playtime it may suggest engagement with the game and hence a positive emotional outcome.

Notable this can be the case even if the associated measured or indicated emotions are negative; this may be referred to as the 'just one more try' appeal of a game, where the emotional payoff of success may be dependent on the degree of frustration of preceding attempts. In this case a game where periodic measurements indicate anger or frustration, but (sometimes) end with joy or relief, may for example be distinguished by play duration being longer than a mean duration; those who persist at such a task enjoy the payoff. In this can it may be that certain emotional states (or emotional state trajectories) together with play time lengths can indicate whether a particular user will appreciate such a game/quest/mode or not.

Other examples of how relative play duration may indicate positive or negative emotional outcomes will be apparent to the skilled person, and may vary with game genre or title.

As noted previously, the above approach may also be used for a game that a current user is already playing, in order to promote a quest/level/zone/mode that will encourage further play; if a user can anticipate a positive emotional outcome from continued play, then they are more likely to continue playing.

Figure 2:
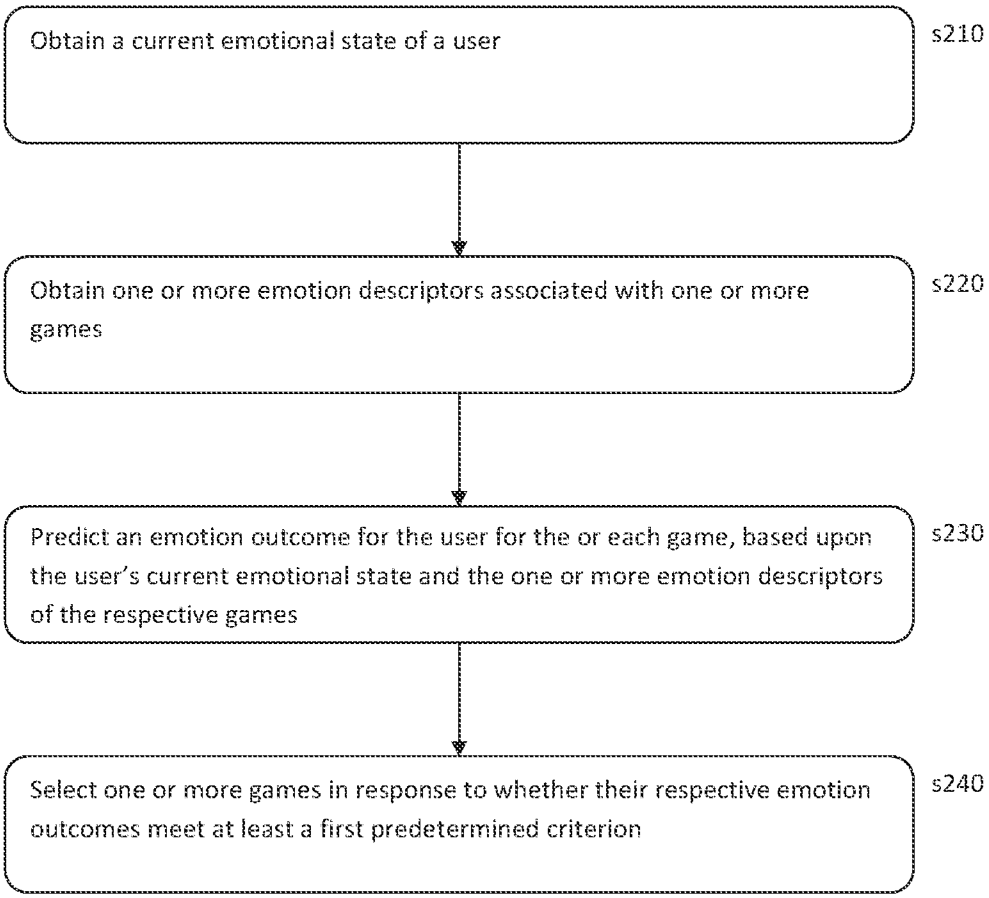
FIG. 2 is a flow diagram of a game selection method in accordance with embodiments of the description.

Turning now to FIG. 2, in an embodiment of the present description a game selection method comprises the following steps. In a first step s210, obtaining a current emotional state of a user, as described elsewhere herein. In a second step s220, obtaining one or more emotion descriptors associated with one or more games, as described elsewhere herein. In a third step s230, predicting an emotion outcome for the user for the or each game, based upon the user's current emotional state and the one or more emotion descriptors of the respective games, as described elsewhere herein. And in a fourth step s240, selecting one or more games in response to whether their respective emotion outcomes meet at least a first predetermined criterion, as described elsewhere herein.

It will be apparent to a person skilled in the art that variations in the above method corresponding to operation of the various embodiments of the apparatus as described and claimed herein are considered within the scope of the present invention, including but not limited to that: the predicting step comprises predicting an emotion outcome based on a previously determined correlation between at least a first aspect of an emotion descriptor, at least a first aspect of the obtained current emotional state of the user, and a corresponding emotion outcome, as described elsewhere herein; and the correlation between one or more aspects of an emotion descriptor and of an emotional state, and an emotional outcome, is based upon emotion data from a corpus of previous players, as described elsewhere herein.

Player Matching/Selection

The principles described previously herein may also be applied to matching players based on sentiment. In this case, alternatively (or in addition to) basing a game selection on the emotion outcome for a player of a particular game or game part, a suitably configured system can base player matching/selection on the emotion outcome for a player when paired with a particular other player or players.

In this case the evaluation can be one-sided (i.e. only considered for the benefit of one player, for example in the case where that player may be more vulnerable, as in the case of a child), or weighted more in favour of such a player, or alternatively may equally evaluate the benefit for both players, for example to achieve a largest combined positive emotion outcome.

In this case the library of available games is replaced with a list of available other players; for example players queuing to play a same online game, or seeking a match (optionally for any of one or more games), or players (for example in a friends list) to whom an invitation to play might be sent.

Hence also in this case the emotion descriptors of the respective games are replaced with emotion descriptors of the respective other players.

It will be appreciated that the emotion descriptors of the respective other players may be provided by the current emotional state of each other player, obtained in a similar manner to the current emotional state of the user as described elsewhere herein.

Alternatively or in addition, a historical description of each player may optionally be used. Such a description may for example be a histogram, tally, or normalised sum of emotion descriptor values, for example to indicate that a particular player is frustrated 20% of the time, happy 40% of the time, angry 30% of the time and disengaged 10% of the time.

This historical information may optionally be used in conjunction with the other player's current emotional state; this may help for example to indicate if the other player's current emotional state is likely to remain or revert to a particular type.

Such historical information can also be accumulated for separate games genres, titles, game modes, etc., so that a more accurate model of their typical emotional state can be used in conjunction with their current emotional state (or, for example in the case of sending an invite to a user who is currently not playing a game, optionally in lieu of information about their current emotional state).

Similarly, such historical information can alternatively or in addition be accumulated for different times of day or different days of the week, recognising that players can tend to different moods at different times (e.g. higher stress levels during working week, or susceptibility to frustration if play is time-limited at certain times of day due to other pressures, for example).

Revisiting the game selection system described previously herein:

The emotion processor can be configured in essentially the same way to obtain a current emotional state of the user. Optionally a historical state as described above can also be accessed to augment the characterisation of the user's emotions.

The emotion processor may also operate to update any maintained historical information (as described above) based on the current emotional state of the user. This information may be held locally on the user's system, and/or may be stored remotely, for example in association with the user's registered account details.

The description processor can also be configured in essentially the same way to obtain emotion descriptors, except that as noted previously herein these descriptors now relate to other players rather than a list of available games.

Hence whilst previously the emotion descriptor for all or part of a game or game mode typically indicated the emotional state that a typical or average user may be expected to occupy when/after playing the relevant game, when considering matches between players the emotion descriptor typically indicates the other player's current and/or historical emotional state.

The evaluation processor is still configured to predict an emotion outcome based on a previously determined correlation between at least a first aspect of an emotion descriptor, at least a first aspect of the obtained current emotional state of the user, and a corresponding emotion outcome, as described elsewhere herein.

Hence in this instance the user's current emotional state and the emotion descriptor for another player are used as input (optionally together with historical emotion data for the user) to the evaluation processor.

To predict what emotional state a user will end up in based on their current emotional state or emotional state sequence and the other player's emotion descriptor, a correspondence or correlation can be learned for example based on data from a corpus of users in a similar manner to that described previously herein.

Hence the correlation between one or more aspects of an emotion descriptor and of an emotional state, and subsequent emotional outcome, can be based upon emotion data from a corpus of previous players.

In this case, data from a plurality of players may be previously obtained in a similar manner to how the current emotional state of the current user is obtained (indicated or measured). These players may be quality assurance testers, alpha or beta testers, early access users, and/or an initial and/or previous tranche of players of the game.

As before, any suitable correlator may be used for this purpose, including for example a machine learning system such as a neural network.

Hence for example a trained machine learning system may receive as input one or more aspects of the user's current emotional state (for example an input emotion vector comprising values relating to the probability of different emotional states, or alternatively or in addition just a flag for a particular emotion) and one or more aspects of the other player's emotion descriptor (again for example an input emotion vector comprising values relating to the probability of different emotional states, or alternatively or in addition just a flag for a particular emotion). These inputs may also include historical emotion data as noted elsewhere herein, or in the case of the other player, optionally only historical data (e.g. if their current emotional state is not available).

During training, the machine learning system receives as a target output one or more aspects of the user's eventual emotional state after playing against the other player. Again for example an emotion vector comprising values relating to the probability of different emotional states, or alternatively or in addition just a flag for a particular emotion; and/or other data such as explicit emotional feedback from the user (e.g. a description or a satisfaction rating), and/or a proxy for such a rating such as the relative duration of play—for example playing for a longer than an average period denotes a positive emotional outcome, and shorter than average denotes a negative outcome, and/or playing until an in-game goal is completed denotes a positive outcome, whilst quitting before the notional goal has been completed or reached may indicate a negative outcome.

In this way, the machine learning system learns to predict the emotional outcome of a user (or a proxy thereof) based on their current emotional state and the other player's emotion descriptor.

Proxies for successful emotional outcomes may include gameplay length and/or direct feedback from the user, as noted above, and also (for example to link with historical data), the frequency of uses of such an emotional-match making service, or the proportion of its uses compared to an alternative available match making service may indicate its perceived success in satisfying the user's emotional wants.

It will be appreciated that for two or more players, a positive emotional outcome is desirable for all of them, or at least a threshold number of participants (e.g. a majority).

Consequently the above process may be implemented for a plurality of respective players, and where the emotional outcome for a player pairing is positive for both players (in other words where the emotional outcome is positive for each of a pair of users when the other user is selected as the other player), this is a candidate match.

Alternatively, the correlator can be trained to predict a combined emotional outcome for both players rather than just one. However this might optionally require a larger training set if the correlator needs to be trained against a more complex or higher dimensional target outcome as a result of attempting to reflect the combined outcome of the pairing or grouping.

In either case, in principle the pairing or grouping with the highest overall positive emotional outcome would be selected, but optionally there may be other factors to take into account as well, such as for example whether players are also on each other's friends lists, or if there is a difference in age that spans a particular predetermined gap, or threshold age, such as one player being under 12 and the other being over 18.

Hence in the first instance, the match with the highest combined emotional outcome may be selected, whereas in other instances, a shortlist of matches may be identified, and then assessed against further criteria such as being on a mutual friends list, age difference, commonality of language, relative skill level in the game, and the like. Conversely, in order to limit computational overhead, the set of prospective players may optionally be assessed against such further criteria first to create subsets of players based on these criteria, and the evaluation processor then operates within respective subsets when predicting emotional outcomes for pairs or groupings.

As noted above, the machine learning system may be trained on inputs that also comprise historical emotion data, which in turn may be a subset of historical emotion data relating to time of day, day of week, game genre, and/or game title.

Furthermore as noted above the machine learning system may be trained on inputs that also comprise an emotional descriptor of the game as previously described herein, so that not only the potential other player but also the game may be used when predicting the emotional outcome for the user.

This approach may be extended beyond one-to-one matches to cooperative teams or free-for-all opponents; for example when assigning a queue of users to respective instances of an online game, the emotional outcomes of at least a subset of pairings within a set of users may be used in a similar manner to that described above to select which is as well occupy respective instance of the game. In this case, choosing whether another player should be on the same team or an opposing team may be considered different game modes (e.g. cooperative versus adversarial) and use respectively trained correlators.

Similarly, the techniques herein may be extended to evaluate more than two players at the same time; for example a set of N players may be shortlisted for possible inclusion in a team (for example based on relative age, languages, or other demographic considerations; or whether they are friends as identified by a friends list, or friends of friends, or the like); then a correlator may receive inputs for M players (when M<N) selected from the shortlist, and after either running through a full set of combinations of possible players, or a predetermined number of selections (e.g. to limit computational overhead), choosing the set of M players resulting in the best output emotional outcome.

An alternative evaluation processor does not use a correlation mechanism such as a neural network; instead it compares the emotional state of the user with those of other players to identify players in a similar emotional state (and/or with similar emotional historical data). Close matches may then be paired.

This will tend for example to match aggressive players with each other rather than with less experienced players or those who do not show many signs of aggression or frustration during play.

As noted elsewhere herein, a user's current emotional state, and similarly that of another player, may be expressed as an input vector. Consequently their distance from each other within a vector space may be evaluated to determine the relative similarity of the two emotional states. Such emotion vector may also comprise information about the user's emotional history in a similar manner. Whether two factors are within a predetermined threshold distance from each other, they may be considered emotionally similar for the purposes of matchmaking.

This approach may also be more computationally efficient for selecting groups of players, where otherwise there may be a large overhead to using the correlator to evaluate different combinations; emotional descriptors for a set of users, expressed as vectors, may be evaluated to find clusters of users with similar emotional states (and optionally emotional histories), and users may be grouped within instances of the game according to these clusters.

Optionally such clusters, themselves being subsets of the available players, may then be refined to identify a better subset using the correlation techniques described previously herein.

A further alternative evaluation processor uses heuristics; each players emotional state (optionally including emotional history) is classified, for example using a previously labelled k-means clustering system, or similarly labelled regions within an emotional state space. Once classified, heuristics for good combinations of players are applied to select pairings or groups according to the relative role within the game e.g. collaborative or adversarial.

Good combinations of players may be determined empirically based on duration of play as a proxy for satisfaction, or using explicit feedback, or the other methods for measuring emotional state as described previously herein.

Similarly, optionally bad combinations of players may be similarly determined, to keep players with certain emotional states apart (either within an instance of a game, or within the same team for example).

Hence more generally the evaluation processor may identify players with compatible emotional states, either to a first approximation by comparing them for similarity of emotional state; to a second approximation by classifying emotional state and using heuristics to select pairs or groups of users based on their emotional states; or to a third approximation by using a correlator trained to predict an emotional outcome of at least one user in response to of a pairing or grouping of players.

Finally, the selection processor is configured to select one or more players in response to whether predicted emotion outcome(s) meet at least a first predetermined criterion.

The criteria may vary according to the approximation at which the evaluation processor operates; hence for example the criterion to a first approximation may be an emotional state within a threshold degree of similarity, and where multiple possible matches are within the threshold degree, optionally choosing the closest pairs or groups. The criterion to a second approximation may be to select those combinations of players that empirically indicate the best emotional states for the pairing or group, and optionally avoiding specific bad combinations.

The criteria for the third approximation are described elsewhere herein, but include as non-limiting examples particular emotional outcomes, or whether those outcomes are generally classed as positive.

In any of the above cases, the criterion can be suited to a game genre, game title or game mode (e.g. adversarial or cooperative) and hence differ according to any one or more of these. Hence in one game a heightened sense of tension may be desirable, whereas in another a sense of calm or happiness is preferred; being paired with a player in an incompatible emotional state may prejudice this emotional outcome, and this is reflected in the output of the evaluation processor and used by the selection processor to select which players to pair or group.

Finally, the emotional state of a player (current, historical, or a weighted blend) can be used to drive an indicator associated with the player's on-line presence (e.g. in association with an online alias, and/or an online avatar); the indicator may indicate that emotional state, and/or (after evaluation according to the techniques herein), the player's apparent compatibility with the user; hence for example a player's avatar may have a facial expression based on the emotional state (or an emoji, or colour code, or animation/posture/gesture/other modification, or other indicator that may be easier to see from a distance or when not facing someone); alternatively or in addition a player may have a compatibility indicator associated with them, the indicator typically appearing differently for different respective users looking at them. In a social environment (for example a virtual game lobby); emotional match evaluations as described herein could be run when two players move within a predetermined distance of each other, or when one user requests or similarly attempts to view a match evaluation of another, or when other social interaction between them is implied; for example if they talk or type within a predetermined distance of each other, or are within a threshold of the centre of each other's field of view for a threshold period of time, or the like.

Figure 3:
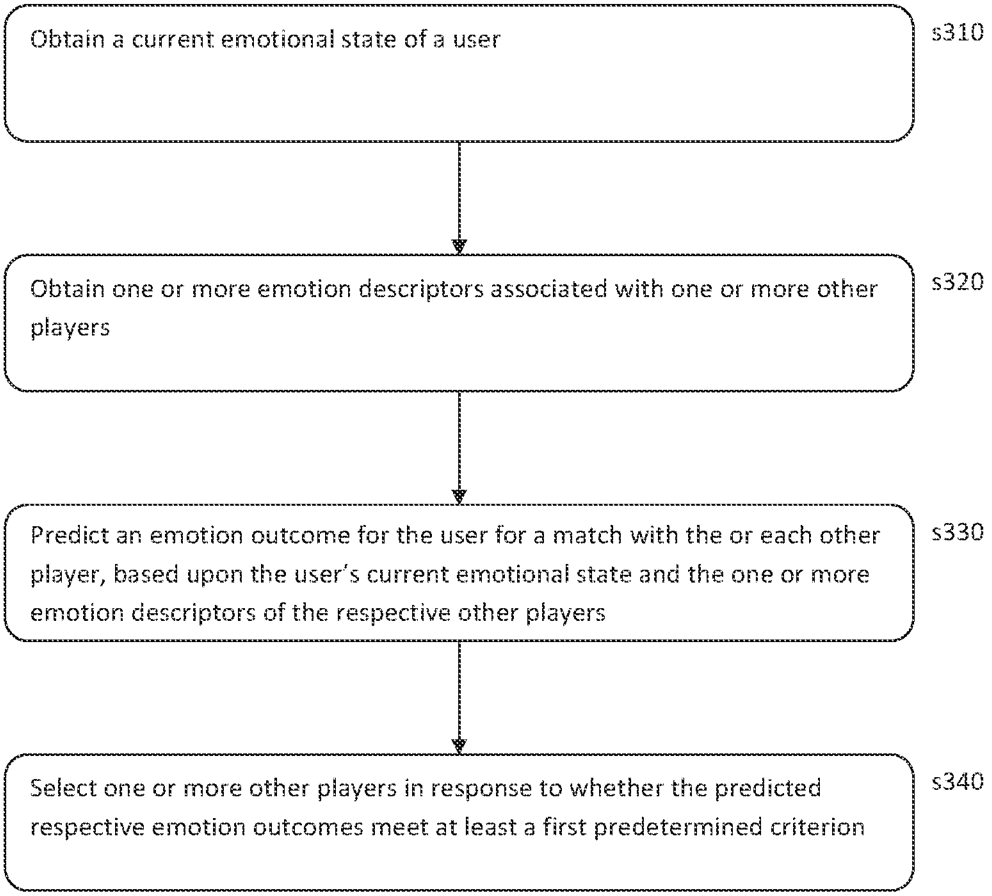
FIG. 3 is a flow diagram of a player selection method in accordance with embodiments of the description.

Turning now to FIG. 3, in a summary embodiment of the present description, a player selection method comprises the following steps. In a first step s310, obtaining a current emotional state of a user, as described elsewhere herein. In a second step s320, obtaining one or more emotion descriptors associated with one or more other players, as described elsewhere herein. In a third step s330, predicting an emotion outcome for the user for a match with the or each other player, based upon the user's current emotional state and the one or more emotion descriptors of the respective other players, as described elsewhere herein. And in a fourth step s340, selecting one or more other players in response to whether the predicted respective emotion outcomes meet at least a first predetermined criterion, as described elsewhere herein.

It will be apparent to a person skilled in the art that variations in the above method corresponding to operation of the various embodiments of the apparatus as described and claimed herein are considered within the scope of the present invention, including but not limited to that:

- the step of obtaining an indication of the user's current emotional state may include from one or more selected from the list consisting of in indication of mood from the user via a user interface; and an indication of mood from a psychometric or behavioural test embedded within a game or other app used by the user within a predetermined prior period, as described elsewhere herein;
- the step of obtaining an indication of the user's current emotional state may comprise estimating the user's current emotional state based upon one or more selected from the list consisting of one or more physiological measurements, one or more behaviours, body language, one or more facial expressions, one or more spoken expressions, and use of a user input device relative to a baseline use, as described elsewhere herein;
- emotion descriptors associated with one or more other players comprise estimates of the other player's emotional state obtained in a similar manner to the estimate of the user's emotional state, as described elsewhere herein;
- the prediction step may comprise further basing the prediction on one or more selected from the list consisting of historical emotional state data of the user, in addition to the user's current emotional state, historical emotional state date of the other player, in addition to the other player's current emotional state, and historical emotional state date of the other player, in the absence of available information about the other player's current emotional state, as described elsewhere herein;
- the prediction step may comprise further basing the prediction on one or more selected from on emotion descriptors associated with one or more selected from the list consisting of a game, respective quests or levels of a game, and respective playing modes of a game, as described elsewhere herein;
- the prediction step may comprise predicting an emotion outcome based on a previously determined correlation between at least a first aspect of an emotion descriptor, at least a first aspect of the obtained current emotional state of the user, and a corresponding emotion outcome, as described elsewhere herein;
- in this case, optionally the correlation between one or more aspects of an emotion descriptor and of an emotional state, and an emotional outcome, is based upon emotion data from a corpus of previous players, as described elsewhere herein;
- the predetermined criterion is one or more selected from the list consisting of the predicted emotional outcome matching a desired emotional outcome indicated by the user, the predicted emotional outcome being in a predetermined group of emotional outcomes that includes a desired emotional outcome indicated by the user, and the predicted emotional outcome being in a predetermined group of emotional outcomes selected as being positive, as described elsewhere herein;
- the predetermined criterion is evaluated for both the user and the other player, as described elsewhere herein;
- the selection step comprises selecting one selected from the list consisting of an other player to play with the user, an other player to play with the user in a particular play mode, an other player to play with the user in a particular game, a team of other players and the user to play cooperatively, and a team of other players and the user to play adversarially, as described elsewhere herein;
- the method further comprises the step of launching one selected from the list consisting of a quest or level of a game currently accessible by the user and at least one other player selected to play with the user, a game currently accessible by the user and at least one other player selected to play with the user, in a particular play mode, and a game currently accessible by the user and at least one other player selected to play with the user, as described elsewhere herein; and
- an indication step to provide a visual indication within a virtual environment that an other player meets at least the first predetermined criterion, as described elsewhere herein.

It will be appreciated that the above methods may be carried out on conventional hardware (such as entertainment device 10) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence as described elsewhere herein, in an summary embodiment of the present description a player selection system (such as entertainment device 10, for example in the form of a PlayStation 4 or 5, or a virtual or cloud hosted equivalent) comprises an emotion processor (for example CPU 20 and/or GPU 30) configured (for example by suitable software instruction) to obtain a current emotional state of a user; a descriptor processor (for example CPU 20 and/or GPU 30) configured (for example by suitable software instruction) to obtain one or more emotion descriptors associated with one or more other players; an evaluation processor (for example CPU 20 and/or GPU 30) configured (for example by suitable software instruction) to predict an emotion outcome for the user for a match with the or each other player, based upon the user's current emotional state and the one or more emotion descriptors of the respective other players; and a selection processor (for example CPU 20 and/or GPU 30) configured (for example by suitable software instruction) to select one or more other players in response to whether the predicted respective emotion outcomes meet at least a first predetermined criterion.

Instances of this summary embodiment implementing the methods and techniques described herein (for example by use of suitable software instruction) are similarly envisaged within the scope of the application.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A player selection system, comprising:

one or more processors; and a memory coupled to the one or more processors and including instructions that when executed by the one or more processors cause the one or more processors to perform operations comprising:

obtaining a current emotional state of a user;

obtaining one or more emotion descriptors associated with one or more other players;

predicting, using a machine learning model, an emotion outcome for the user for a match with another player or each other player of the one or more other players, based upon distances in a vector space computed by the machine learning model between an input vector associated with the current emotional state of the user and input vectors associated with the one or more emotion descriptors; and selecting one or more other players in response to whether the emotion outcome meets at least a first predetermined criterion.

2. The player selection system of claim 1, wherein an indication of the current emotional state of the user is obtained from one or more of:

i. an indication of mood from the user via a user interface; and ii. an indication of mood from a psychometric or behavioral test embedded within a game or other app used by the user within a predetermined prior period.

3. The player selection system of claim 1, wherein the current emotional state of the user is estimated based upon one or more of:

i. one or more physiological measurements;

ii. one or more behaviors;

iii. body language;

iv. one or more facial expressions;

v. one or more spoken expressions; and vi. use of a user input device relative to a baseline use.

4. The player selection system of claim 1, wherein emotion descriptors associated with the one or more other players comprise estimates of emotional states of each other player of the one or more other players obtained in a similar manner to the estimate of the current emotional state of the user.

5. The player selection system of claim 1, in which: the evaluation processer is wherein the machine learning model is configured to further base its prediction on one or more of:

i. historical emotional state data of the user, in addition to the current emotional state of the user;

ii. historical emotional state data of each other player of the one or more other players; and iii. current emotional state data of each other player of the one or more other players.

6. The player selection system of claim 1, wherein the machine learning model is configured to further base its prediction on emotion descriptors associated with one or more of:

i. a game;

ii. respective quests or levels of a game; and iii respective playing modes of a game.

7. The player selection system of claim 1, the machine learning model is configured to predict an emotion outcome based on a previously determined correlation between at least a first aspect of an emotion descriptor, at least a first aspect of the obtained current emotional state of the user, and a corresponding emotion outcome.

8. The player selection system of claim 7, wherein the correlation between one or more aspects of an emotion descriptor and of an emotional state, and an emotional outcome, is based upon emotion data from a corpus of previous players.

9. The player selection system of claim 1, wherein the predetermined criterion is one or more of:

i. the emotion outcome matching a desired emotional outcome indicated by the user;

ii. the emotion outcome being in a predetermined group of emotional outcomes that includes a desired emotional outcome indicated by the user; and iii. the emotion outcome being in a predetermined group of emotional outcomes selected as being positive.

10. The player selection system of claim 1, wherein the predetermined criterion is evaluated for both the user and each other player of the one or more other players.

11. The player selection system of claim 1, wherein selecting one or more other players comprises selecting one of:

i. an other player to play with the user;

ii. an other player to play with the user in a particular play mode;

iii. an other player to play with the user in a particular game;

iv. a team of other players and the user to play cooperatively; and v. a team of other players and the user to play adversarially.

12. The player selection system of claim 1, wherein the operations further comprise one of:

i. launching a quest or level of a game currently accessible by the user and at least one other player selected to play with the user;

ii. launching a game currently accessible by the user and at least one other player selected to play with the user, in a particular play mode; and iii. launching a game currently accessible by the user and at least one other player selected to play with the user.

13. A player selection method, comprising:

obtaining a current emotional state of a user;

obtaining one or more emotion descriptors associated with one or more other players;

predicting, using a machine learning model, an emotion outcome for the user for a match with another player or each other player of the one or more other players, based upon distances in a vector space computed by the machine learning model between an input vector associated with the current emotional state of the user and input vectors associated with the one or more emotion descriptors; and selecting one or more other players in response to whether the emotion outcome meets at least a first predetermined criterion.

14. The player selection method of claim 13, further comprising predicting an emotion outcome based on a previously determined correlation between at least a first aspect of an emotion descriptor, at least a first aspect of the obtained current emotional state of the user, and a corresponding emotion outcome.

15. A non-transitory, computer-readable storage medium containing a computer program comprising computer executable instructions adapted to cause a computer system to perform a player selection method, comprising:

obtaining a current emotional state of a user;

obtaining one or more emotion descriptors associated with one or more other players;

predicting, using a machine learning model, an emotion outcome for the user for a match with another or each other player of the one or more other players, based upon distances in a vector space computed by the machine learning model between an input vector associated with the current emotional state of the user and input vectors associated with the one or more emotion descriptors; and selecting one or more other players in response to whether the emotion outcome meets at least a first predetermined criterion.

* * * * *